(12) United States Patent
Cazals (10) Patent No.: US 8,220,739 B2
(45) Date of Patent: Jul. 17, 2012

(54) BEAM MOUNTED REAR PROPULSION SYSTEM FOR AN AIRCRAFT AND AIRCRAFT WITH SUCH SYSTEM

(75) Inventor: Olivier Cazals, Daux (FR)

(73) Assignee: Airbus Operations SAS, Toulouse (FR)

( * ) Notice: Subject to any disclaimer, the term of this patent is extended or adjusted under 35 U.S.C. 154(b) by 593 days.

(21) Appl. No.: 12/393,625

(22) Filed: Feb. 26, 2009

(65) Prior Publication Data

US 2010/0044502 A1 Feb. 25, 2010

(51) Int. Cl.
*B64D 27/02* (2006.01)
*B64D 41/00* (2006.01)
*B64D 29/00* (2006.01)

(52) U.S. Cl. ........................................................ 244/58
(58) Field of Classification Search .................... 244/54, 244/58; 248/554, 555, 556, 557; 60/796, 60/797
See application file for complete search history.

(56) References Cited

U.S. PATENT DOCUMENTS

| 4,411,399 A * | 10/1983 | Hapke ............................ 244/130 |
| 6,039,287 A * | 3/2000 | Liston et al. ..................... 244/54 |
| 6,244,539 B1 * | 6/2001 | Liston et al. ..................... 244/54 |
| 6,308,915 B1 * | 10/2001 | Liston et al. ..................... 244/54 |
| RE39,972 E * | 1/2008 | Royalty ............................ 244/54 |
| 7,665,694 B2 * | 2/2010 | Hein et al. ..................... 244/129.5 |
| 2005/0224635 A1 * | 10/2005 | Hein et al. ......................... 244/10 |
| 2006/0102776 A1 * | 5/2006 | Hein et al. ......................... 244/10 |
| 2006/0102781 A1 * | 5/2006 | Hein et al. ......................... 244/58 |
| 2008/0078863 A1 * | 4/2008 | Lwasa et al. ..................... 244/58 |
| 2008/0099611 A1 * | 5/2008 | Martino Gonzalez et al. ............................. 244/119 |
| 2011/0084192 A1 * | 4/2011 | Olsen et al. .................... 248/557 |

FOREIGN PATENT DOCUMENTS

| EP | 1 010 618 A1 | 6/2000 |
| EP | 1 918 203 A | 5/2008 |
| GB | 711 719 A | 7/1954 |
| GB | 1 212 875 A | 11/1970 |
| WO | 2005/016748 A | 2/2005 |

* cited by examiner

*Primary Examiner* — Troy Chambers
(74) *Attorney, Agent, or Firm* — Perman & Green, LLP (57) ABSTRACT

A propulsive system for an aircraft including an auxiliary jet engine is integrated into a tail cone of a fuselage. A carrying structure of the jet engine is primarily formed with beams and frames or half-frames to which the auxiliary jet engine is fixed by lateral beams. The beams are interdependent of the frames and half-frames, and the beams are overhanging behind a frame behind which is fixed the engine. Each beam includes a lower half-beam and a higher half-beam, separated on at least a part of its length ahead from attachments of the jet engine to determine a space free of structure impediment for lateral air intakes.

8 Claims, 4 Drawing Sheets

BEAM MOUNTED REAR PROPULSION SYSTEM FOR AN AIRCRAFT AND AIRCRAFT WITH SUCH SYSTEM

CROSS-REFERENCE TO RELATED APPLICATIONS

This application claims priority to French application No. 08 51337 filed on 29 Feb. 2008, the disclosure of which is incorporated by reference herein in its entirety.

BACKGROUND

1. Field

The disclosed embodiments belong to the field of aircraft powered by jet engines such as transport civil aircraft.

More particularly the disclosed embodiments relate to an aircraft including at least an engine installed within the fuselage tail section in order to be used only in certain running phases of the aircraft on the ground or in flight.

2. Brief Description of Related Developments

For safety reasons and in order to fulfill the certification lawful requirements, the transport aircraft comprise two or several engines to survive to engine failure cases during the various flying, takeoff, cruising or approach and landing phases.

While respecting the certification criteria and the operational constraints, the choice of the number and the characteristics of the engines is the result of compromises implying the desired, or required, performances of the aircraft in its various flying phases and in the various probable operating situations of the engines.

However, for industrial and operational reasons, the various engines of an aircraft in commercial exploitation are of the same model which has advantages in the field of the engines maintenance but does not present necessarily an optimum in term of thrust balance, carried mass for the propulsion and aerodynamic drag.

Moreover, to ensure an autonomous production of energy, electricity, compressed air . . . , aboard an aircraft in order to feed the various aircraft systems when the engines are stopped, on the ground before the startup of the engines, or in an exceptional way, in flight in the event of generations loss on the engines, the civil aircraft very frequently comprise an auxiliary power generator, generally designated by APU for Auxiliary Power Unit, dedicated to this service.

A drawback of the APU systems comes from the mass that they represent and which must be permanently transported mainly for a ground use.

A considered solution, presented in the U.S. Pat. No. 6,247, 668, consists in using a particular jet engine to provide the functions of the APU when it is necessary to have an autonomous energy generation and to provide a complementary propulsion thrust when such a complementary thrust can prove to be useful or necessary.

The particular jet engine is not used when no additional energy or thrust source is necessary what makes it possible to maintain the particular jet engine at stop in order to optimize the fuel consumption.

The particular jet engine, designated by APTU, is fitted within the fuselage tail section, in the practice, approximately at the location of the majority of the APU on the existing aircraft, so that it generates a thrust directed backwards of the aircraft.

An air intake to feed the APTU with a scoop shape on the top of the fuselage has a closed position when the APTU jet engine is not running and this APTU jet engine has not necessarily a thrust identical to that of the other ordinary propulsive engines.

However, this solution was never been implemented on an aircraft and, except using relatively small engines closer to a conventional APU than to an engine, many problems of mechanical installation and aerodynamic integration which are not solved today arise.

SUMMARY

The disclosed embodiments propose an architecture for a rear engine fitted within the fuselage of an aircraft in order to set up an auxiliary propulsive engine and incidentally an autonomous power generation group.

More particularly, the disclosed embodiments relate to a structure for fixing a jet engine inside the rear part of an aircraft fuselage which is completely contained in the envelope of the fuselage tail cone and which allows to respect the constraints of safety as regards the fixing of the engine, particularly in the presence of the risk of engine bursting and allows an optimal operation of the concerned jet engine without aerodynamic penalty for the aircraft when the engine is not running.

According to the aspects of the disclosed embodiments, the auxiliary propulsive system integrated in the fuselage tail cone of the aircraft includes an auxiliary engine, a carrying structure to which is fixed the auxiliary jet engine and a device for supplying external air to said jet engine.

In order to maintain the auxiliary jet engine in the desired position within the fuselage without making difficult its assembly and its disassembling, the carrying structure is primarily formed with beams assembled overhanging on at least a part of their length along the longitudinal direction of the fuselage.

More particularly:
the carrying structure is primarily formed with beams and frames and/or half-frames;
the auxiliary jet engine is fixed to the carrying structure by beams lateral to the engine of the carrying structure;
the beams are interdependent of the frames and half-frames;
the beams are overhanging at the rear, along the displacement direction of the flying aircraft, from a frame behind which the engine is fixed.

In said propulsive system, the lateral beams are arranged along the walls within the fuselage tail cone in order to be used as a structure on which the secondary structure elements and boards of fuselage wall can take support and so that mechanical interferences with the external air supply device are avoided to allow the operation of air intake movable devices and not to generate internal aerodynamic disturbances in the air supply device.

To make a carrying structure ready to resist to failures of primary elements of the structure in question and to allow the installation under good conditions of the systems used by the aircraft and the auxiliary jet engine, each lateral beam of the carrying structure includes two elements designated as half-beams, a lower half-beam and a higher half-beam.

In an example of arrangement of the beams, the half-beams of a same lateral beam are separated on at least a part of its length to form a fork ahead of attachments of the jet engine to the lateral beams to effectively meet the need to avoid mechanical interferences with the air supply device which is advantageously within the constituted fork.

To increase the resistance and the rigidity of the carrying structure and to fix secondary structures of the fuselage tail cone, the carrying structure also includes a higher beam substantially in a longitudinal, vertical symmetry plane of the fuselage, which higher beam, primarily for safety reasons, preferably includes at least two assembled half-beams.

For the same reasons, each of the frames or half-frames of the carrying structure preferably includes at least two assembled elements of close forms to create a so-called "fail-safe" structure.

In one aspect of the disclosed embodiments, engine cowls are articulated at the higher beam and open upwards to free the engine, to give access to it and to facilitate its assembly and disassembling.

In another aspect of the disclosed embodiments, engine cowls are articulated on front parts of the cowls and open forward to obtain equivalent advantages.

A significant rigidity of the carrying structure and particularly an optimal transfer of loads due to the auxiliary jet engine are obtained by fixing the beams or half-beams on a front load carrying frame of the fuselage which corresponds to the sealed bottom of the pressurized cabin of the aircraft fuselage.

In order to optimize the installation of the aircraft empennages at the fuselage tail cone, the lateral beams, or their lower half-beams if necessary, are arranged so that the crossing structure of the horizontal empennage crosses the fuselage tail cone under the beams or lower half-beams of the carrying structure by providing the volumes needed for the displacements of the movable elements, and preferably vertical empennages are fixed at the ends of the horizontal empennage to avoid the deformation of the carrying structure of the auxiliary jet engine by the introduction of unsymmetrical efforts.

The disclosed embodiments advantageously relates to an aircraft including such a propulsive system, which auxiliary propulsive system makes it possible to optimize the size of the main propulsive engines of the aircraft and to be freed from a specific device for auxiliary energy generation APU penalizing except for operations primarily carried out on the ground.

BRIEF DESCRIPTION OF THE DRAWINGS

The auxiliary propulsive system according to the aspects of the disclosed embodiments is described with reference to the figures which schematically represent:

FIG. 3a: a perspective view of the beams assembly carrying the auxiliary jet engine;

FIG. 3a1: a perspective view of a fixing detail of the jet engine;

DETAILED DESCRIPTION OF THE DISCLOSED EMBODIMENTS

Figure 1:
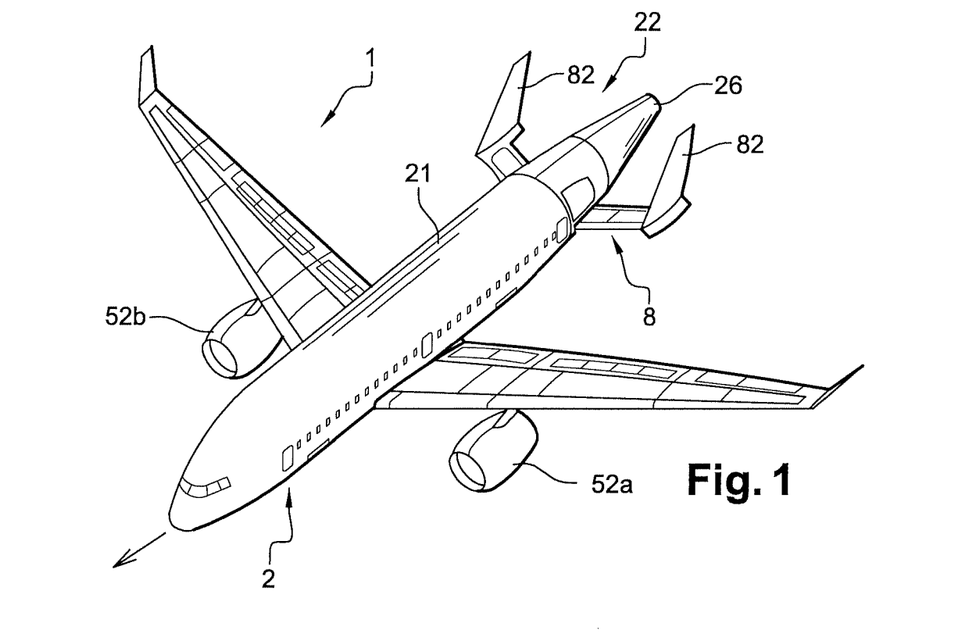
FIG. 1: a perspective view of an aircraft according to the disclosed embodiments in a cruising flight configuration.

On an aircraft 1, shown in FIG. 1, according to the disclosed embodiments a fuselage 2, in a known way, comprises a substantially cylindrical central part 21 which is continued by a rear part 22 of the fuselage known as tail cone, rearwards along the displacement direction (materialized by an arrow directed forward on FIG. 1) of the aircraft during flight, whose sections decrease gradually from a section of the cylindrical part towards a final, relatively small, rear section.

In the following description of the aspects of the disclosed embodiments, it will be indicated by "front" and "rear" the aircraft forward direction along the flight displacement direction and respectively backward along the direction opposed to the flight displacement direction.

Figure 2:
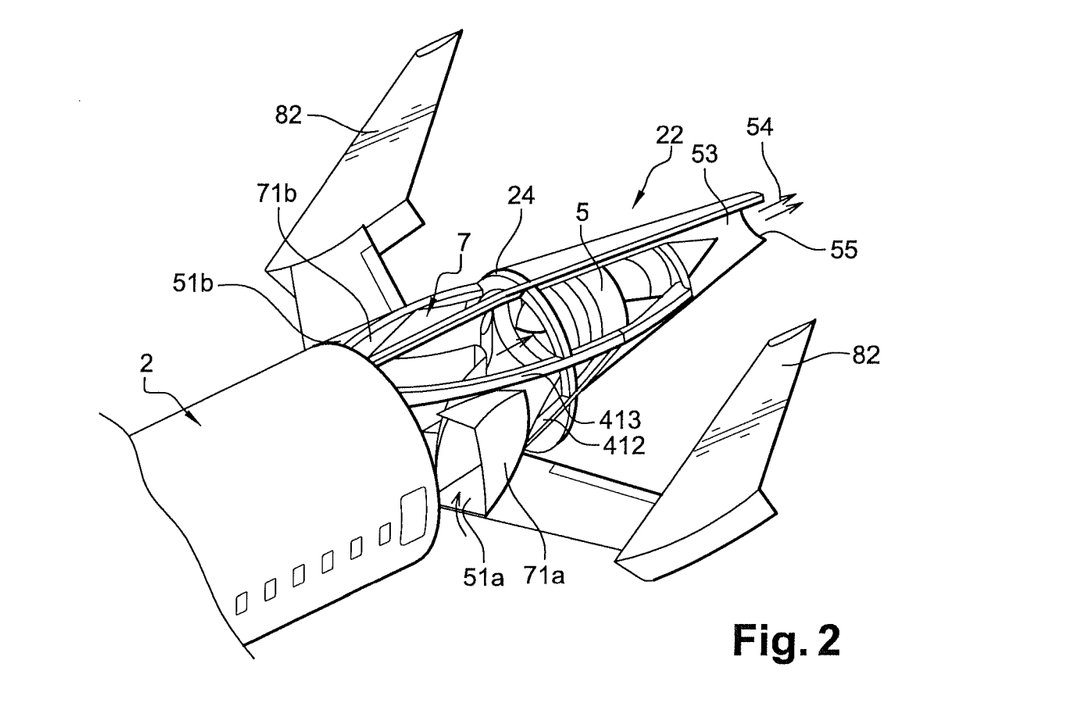
FIG. 2: perspective view partially cut-away of the rear part of the aircraft of FIG. 1 with an opened air intake.

More particularly, in the auxiliary propulsive system according to the disclosed embodiments, the final section corresponds to an exit section of an auxiliary jet engine 5 fixed within the tail cone 22 as illustrated on FIG. 2, said auxiliary jet engine being used as a propulsive engine in a first operating mode and if necessary as an energy generator in a second mode or in a mixed mode associating propulsion and energy generation.

Figures 3A, 3A:
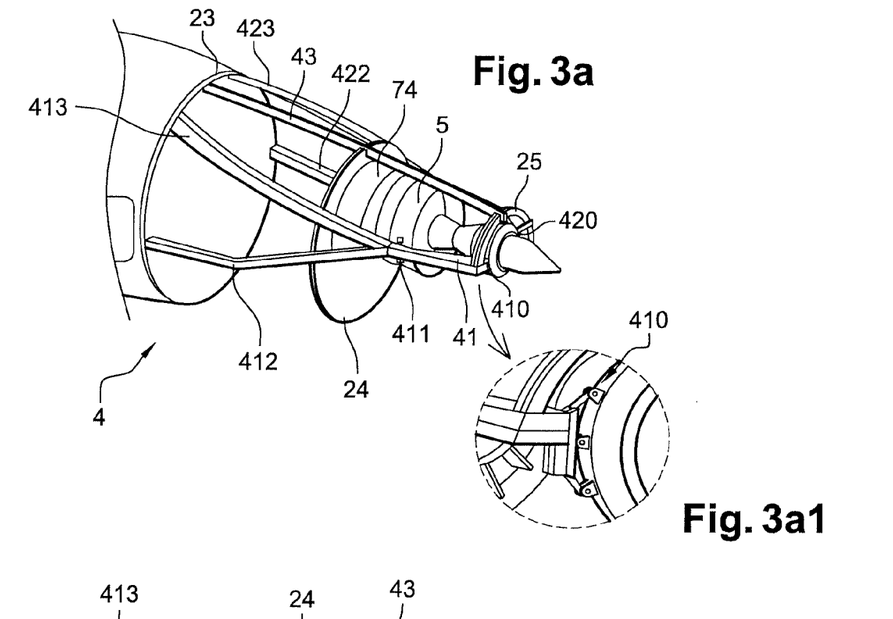
Figures 3B, 3C:
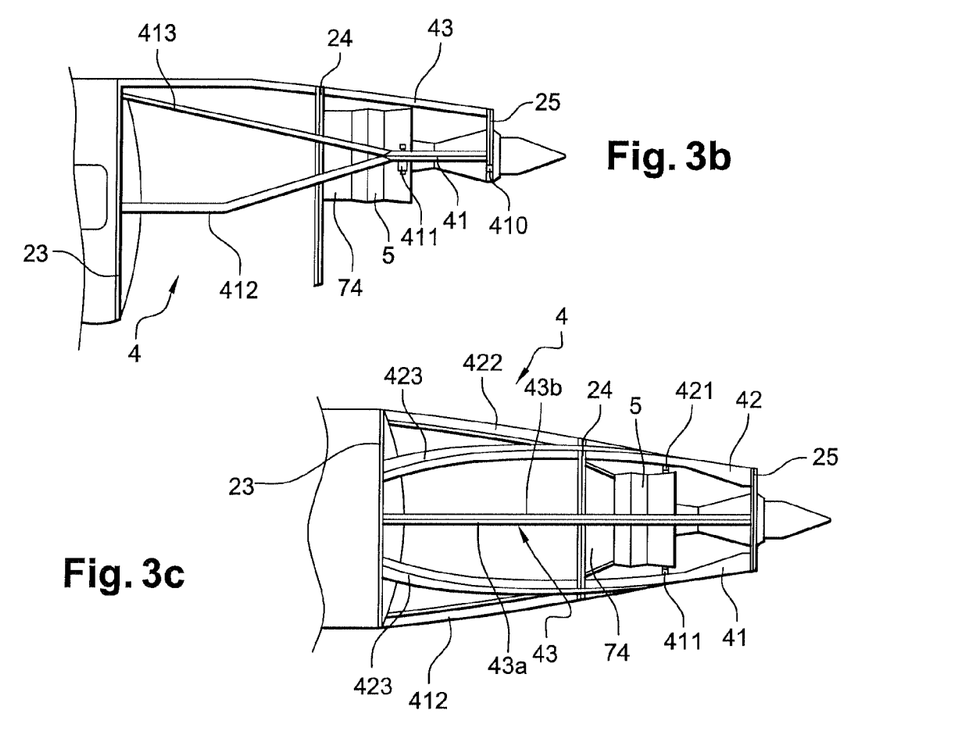
FIG. 3b: a profile view of the beams assembly carrying the auxiliary jet engine.
FIG. 3c: a top view of the beams assembly carrying the auxiliary jet engine.

In order to maintain the auxiliary jet engine 5 substantially in an axial direction relative to fuselage 2, or in a direction desired for the thrust under particular conditions and which can be substantially moved away, particularly, to pitch down or to pitch up from the fuselage axial direction, a carrying structure 4, presented on FIGS. 3a to 3c, is made of a beams assembly to which is fixed the auxiliary jet engine 5 itself.

Said beams assembly includes primarily longitudinal beams 41, 42, 43, i.e., beams whose the largest length direction is substantially directed along the generatrix direction of an external surface of the fuselage 2 in its rear part 22.

According to their lengths, beams 41, 42, 43 extend at least from, ahead, a rear load carrying frame 23 of the fuselage 2 located in front of the auxiliary jet engine 5 up to, rearward, rear attachments 410, 420 of the auxiliary jet engine 5 corresponding to the most backward attachments on said jet engine.

The rear load carrying frame 23 of the fuselage advantageously corresponds to the frame on which is connected a pressurized bulkhead forward which is a cabin of the aircraft 1 in which air is maintained at a pressure higher than the atmospheric pressure during the altitude flights.

Practically, beams 41, 42, 43 do not present requirement to be stopped at the rear load carrying frame 23 and have preferably extensions, not represented, more ahead than the rear load carrying frame 23.

Such extensions aim for example to distribute in the fuselage structure loads introduced by the operation and the mass of the engine.

If necessary, extensions, not represented, more backward than the rear attachments 410, 420 support secondary structures, for example, half-frames on which take support the cowls or fuselage covering elements.

Beams 41, 42, 43 are also interdependent of one or more rear frames located between the rear load carrying frame 23 of the fuselage and a plane located ahead of the auxiliary jet engine 5, particularly a plane corresponding to the most backward frame 24 (the only represented on the figures).

Beams 41, 42, 43 are overhanging behind the most backward frame 24 as illustrated on FIGS. 3a to 3c, i.e., that said beams are overhanging in the zone of the fuselage 2 in which is located the auxiliary jet engine 5.

Advantageously at least a higher half-frame 25, the only half-frame represented on the figures, maintains together the beams 41, 42, 43 in the zone in which said beams are overhanging, at least near their rear ends, at the rear attachments 410, 420 of the jet engine.

In addition, the beams are located at the periphery of the various frames, i.e., close to coverings that ensure the aerodynamic continuity of the fuselage 2 in its rear part 22 and which, for example, comes to be fixed on secondary structures, not represented, taking support on said beams.

For a better visualization of the beams assembly and the installation of the auxiliary jet engine 5, the coverings of the fuselage tail section and the secondary structures are not represented on FIGS. 3a, 3b and 3c.

To fix the auxiliary jet engine 5 to the structure of the fuselage 2 two lateral beams 41, 42 are arranged symmetrically relative to a vertical symmetry plane of the fuselage 2.

At the rear attachments 410, 420 and front attachments 411, 421 of the auxiliary jet engine 5, each lateral beam is double in order to ensure a structural redundancy according to a so-called "fail-safe" design and is located substantially at an horizontal symmetry plane of the auxiliary jet engine 5.

For the same reasons of structure reliability, preferably the frames 24 and/or half-frames 25 as well as the higher beam 43 are also doubled according to a "fail-safe" design.

Preferably, as illustrated on the figures, ahead of the auxiliary jet engine 5, the parts that form a lateral beam 41, 42 according to the "fail-safe" design are separated into a higher half-beam 413, respectively 423, and a lower half-beam 412, respectively 422, which are fixed at the rear load carrying frame 23 of the fuselage on distant locations which has for effect to increase the rigidity of the beams assembly and to facilitate the installation of the systems necessary to the auxiliary jet engine 5 or to the aircraft 1.

Particularly, the front parts 412, 413 on the one hand and 422, 423 on the other hand of the lateral beams are separated by forming forks which make it possible, without penalizing mechanical interference, to install systems necessary to the operation of the engine, for example, an air intake system, or with the aircraft, for example an empennage assembly.

In a not represented embodiment, the half-beams of the lateral beams 41, 42 remain jointed over substantially all their length in the rear zone of the rear frame 23. In this case each lateral beam follows a lower or higher path corresponding, for example, to one of the paths defined by the half-beams forming a fork in the previously described embodiment to avoid mechanical interferences with the other systems.

In the illustrated example the auxiliary jet engine 5 is a jet engine with high by-pass ratio including a front fan into a fan case and a rear gas generator. The jet engine 5 includes ahead, side attachments 411, 421 taken back on the fan case and backward, side attachments 410, 420 taken back on the gas generator part, an assembly qualified as a "fan attachments" type because of the front attachments 411, 421 on the fan case.

Other solutions not represented to fix the auxiliary jet engine 5 to the lateral beams 41, 42 are possible, particularly a solution in which the front attachments 411, 421 are taken back on the gas generator, an assembly qualified as a "core attachments" type.

An example of attachment of the auxiliary jet engine 5 is presented on the FIG. 3a1 detail. Such an attachment includes an assembly of rods and clevis to take the various efforts to be transmitted between the engine and the aircraft structure by said attachment. Advantageously, this type of attachment, associated to the doubled structures of the beams and half-frames, fulfill the safety conditions of the so-called "Fail-safe" design.

The choice of lateral beams 41, 42 and of half-frames 25 behind the rear frame 24, to fix the auxiliary jet engine 5 within the fuselage 2 allows to maintain under the jet engine 5 a space free from obstacle which makes it possible assembly operations of the engine and disassembling operations of the engine by gravity, without complex tools and without structures disassembling.

In the auxiliary jet engine 5 area, the aerodynamic continuity of the fuselage 2 is ensured by movable elements 26 constituting engine cowls, preferably, articulated ones.

Outside, said cowls have a geometry in conformity with the geometry required for the tail cone 22 of the fuselage when the cowls 26 are in a closed position.

Internally, said cowls have a geometry, not represented on figures, which corresponds to the geometry of the aerodynamic channels of the internal flow of the fan flow of the engine 5 when the cowls 26 are in a closed position.

Figure 4A:
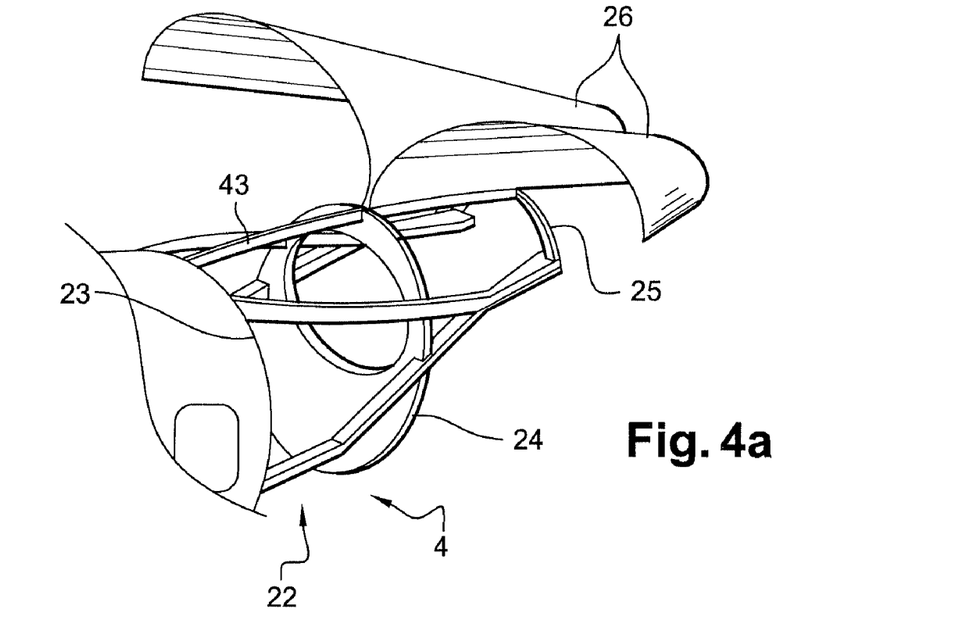
FIG. 4a: a perspective view of the beams assembly without the auxiliary engine illustrating the principle of the engine cowls with opening upwards.

The cowls are, for example, as illustrated on FIG. 4a, articulated above the auxiliary jet engine at the higher beam 43 substantially in the vertical symmetry plane of the fuselage 2 and the jet engine, the cowls 26 opening upward.

The higher beam 43, preferably of a design similar to that of the lateral beams 41, 42, therefore constituted by at least two jointed half-beams 43a, 43b at least partially, is fixed to the rear load carrying frame 23 of the fuselage and to the other rear frames 24 and half-frames 25, and takes part in the structural strength and the rigidity of the beams assembly 4.

Figure 4B:
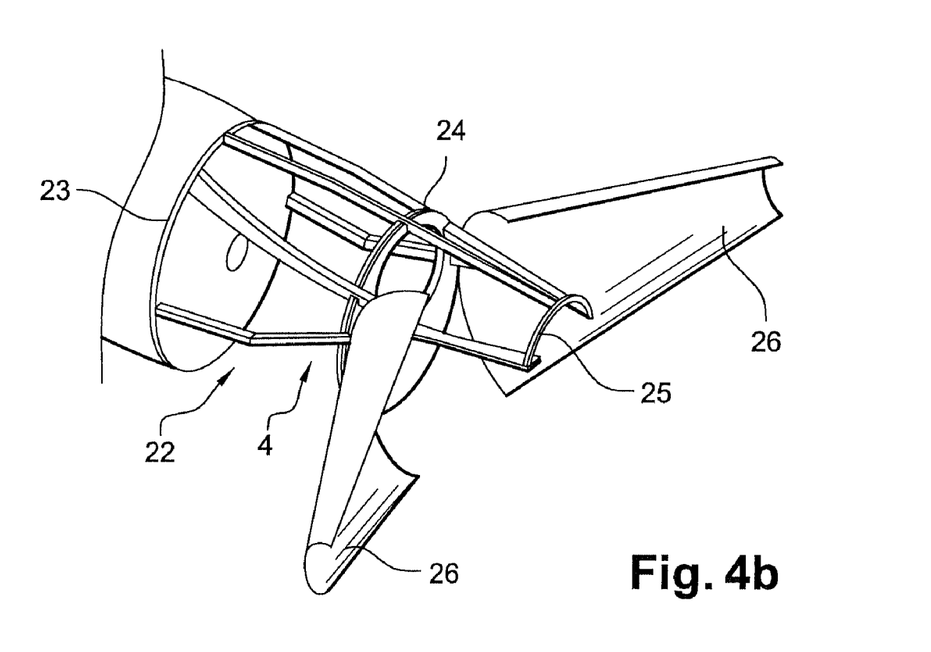
FIG. 4b: a perspective view of the beams assembly without the auxiliary engine illustrating the principle of the engine cowls with opening on the sides.

In another example for realizing the cowls, illustrated on FIG. 4b, the cowls 26 are articulated near the most backward frame 24 located ahead of the engine 5, the cowls 26 opening forward.

In all the cases when the cowls 26 are opened, it is possible for an operator to carry out ordinary maintenance operations on the auxiliary jet engine 5 and said engine is freed from any obstacle making it able to be deposited by gravity.

Figure 4C:
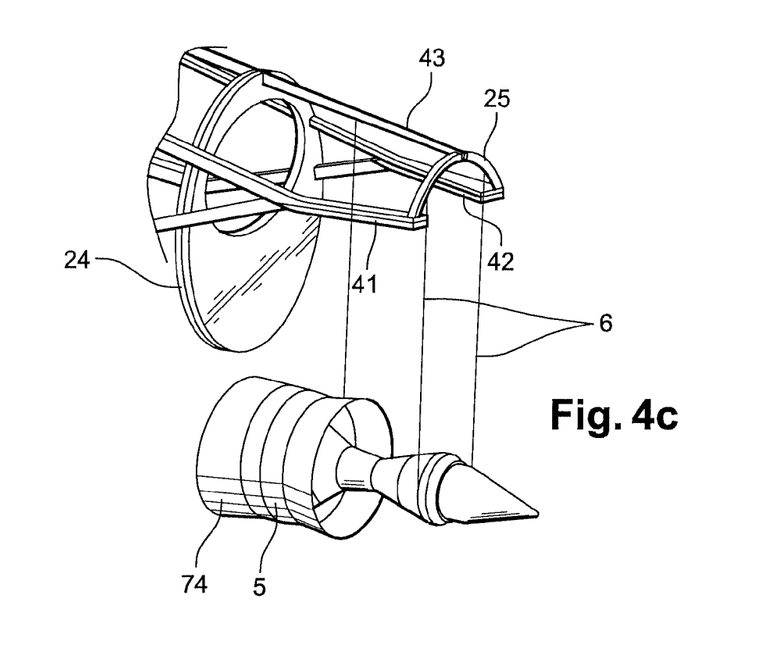
FIG. 4c: a perspective view for the beams assembly illustrating the principle of the assembly and the taking down of the auxiliary engine.

During an operation of assembly or of dismounting of the auxiliary jet engine 5, said engine is advantageously lowered by hoist systems 6 fixed to the lateral 41, 42 or higher 43 beams or to the rear half-frame 25 as illustrated on FIG. 4c.

The auxiliary jet engine 5 in the fuselage 2 is associated to a device 7, illustrated on FIG. 2, for supplying air having to feed said engine.

Figure 5:
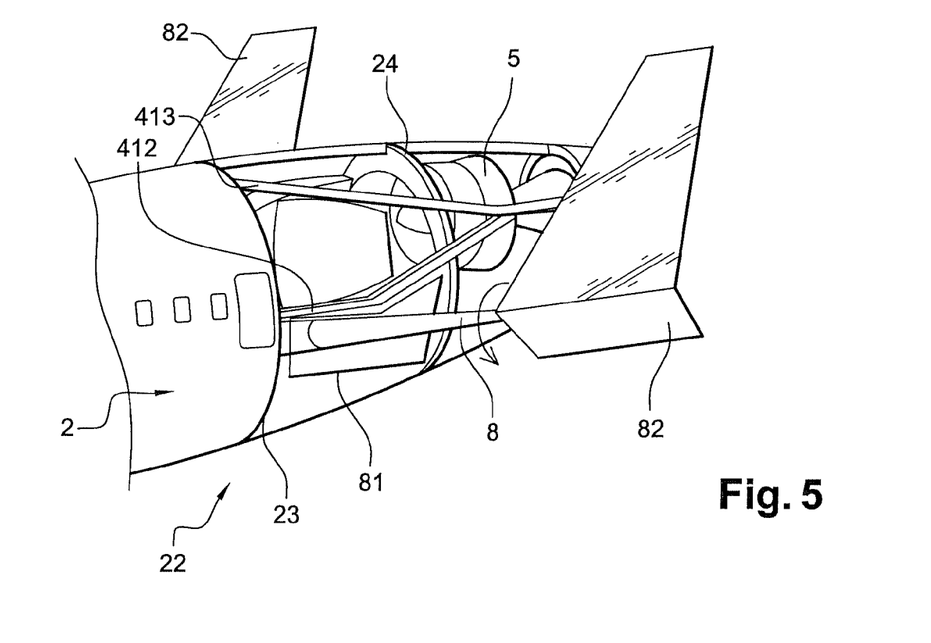
FIG. 5: a cut-away perspective view of the fuselage tail cone and of the empennages.

The air supplying device 7 includes lateral air intakes 51a, 51b having each one at least two positions:
  a so-called closed position, illustrated on FIG. 5 for the air intake visible on the figure;
  a so-called opened position, illustrated on FIG. 2 for the air intake 51a.

The air supplying device 7 also includes an aerodynamic channel associated to each air intake meeting into a common channel at the air intakes ahead of the most rear frame 24 located ahead of the jet engine 5 and a connecting skirt 74 between said rear frame and an entry plane of the auxiliary jet engine 5.

In a preferred embodiment, the connecting skirt 74 is closely fixed to the auxiliary engine 5 and remains thus attached to said engine when this one is dismounted as illustrated on FIG. 4c.

In the closed position, illustrated on FIG. 1, of the lateral air intakes 51a, 51b, the auxiliary jet engine 5 is not supplied with air. Said lateral air intakes are closed and the external surface of the fuselage 2 corresponds substantially to a surface of the fuselage in the continuity of the fixed walls of said fuselage as illustrated on FIG. 1.

As illustrated on partially cut-away FIGS. 2 and 5, each lateral air intake 51a, 51b is arranged between the higher lateral half-beam 413, respectively 423, and the lower lateral half-beam 412, respectively 422, on the corresponding side of the fuselage 2.

By the fitting of the half-beams the aerodynamic flow into the aerodynamic channels for supplying air is not disturbed by the presence of obstacles which the beams or half-beams would have constituted if said beams had crossed said channels, and scoops 71a, 71b or other movable elements of the air intakes are advantageously placed between the half-beams 412, 413, respectively 422, 423.

As illustrated on FIG. 5, the height position relative to the fuselage 2 of the lower lateral half-beams 412, 422, between the rear load carrying frame 23 of the fuselage and the most backward frame 24 ahead of the auxiliary jet engine 5, is such that a sufficient space within the fuselage is available under the lower half-beams 412, 422 for a crossing structure of an horizontal empennage 8 of the aircraft 1, and if necessary it has a space, materialized by a frame marked by 81 on FIG. 5, necessary to the deflections of said empennage moving parts.

This zone of the tail cone 22 is also configured to define a common surface between the tail cone 22 and the horizontal empennage 8. This surface ensures the sealing between the tail cone and the horizontal empennage 8, when the position of said empennage is modified.

In such an arrangement, the horizontal empennage 8 and the associated crossing structure are placed in front of the auxiliary jet engine 5 and are apart from the bursting zones of said jet engine whose fragment would be likely to damage the empennage 8 and/or control surfaces of this empennage.

Moreover, such an arrangement avoids mechanical interferences between the lateral air intakes 51a, 51b and the mechanisms of the scoops 71a, 71b on the one hand and the horizontal empennage 8 and its crossing structure on the other hand.

In an advantageous way, as illustrated on the figures, vertical empennages 82 are fixed substantially at ends in span of the horizontal empennage 8 making a so-called H-shaped tail unit.

This empennage architecture also makes it possible not to introduce particular unsymmetrical efforts into the area of the beams structure 4 on which the auxiliary jet engine 5 is fixed, which would be the case with a vertical fin in the vertical symmetry plane of the fuselage 2, which unsymmetrical efforts would be likely to deform the engine and to harm to its optimal operation.

The implementation of an architecture including an auxiliary jet engine 5 according to the disclosed embodiments makes it possible to optimize the choice of the main propulsive engines, for example, of the jet engines 52a, 52b fixed under the wings as in the example of aircraft illustrated on FIG. 1, according to ordinary flying conditions and not to critical conditions under which the auxiliary jet engine 5 is operated.

The main propulsive engines 52a, 52b are thus of a reduced nominal thrust compared to the case of a design without auxiliary engine which has for effect to reduce dimensions and the mass of said main jet engines and by an induced effect the noise level emitted by said jet engines and the cruising fuel consumption of the aircraft 1.

The characteristics of the auxiliary jet engine 5 are then determined to answer to particular flying conditions requiring an available thrust higher than the thrust that may be provided by the main propulsive engines 52a, 52b.

For example the main propulsive engines 52a, 52b are determined, particularly with respect to the provided thrust, to optimize the flying conditions during the cruise and the auxiliary jet engine 5 is determined to bring the complementary thrust necessary in particular situations, for example, a takeoff phase to answer to a requirement of engine failure during this flying phase, or to constraints at the end of climb at a cruising altitude, or yet operational ceilings with one inoperative engine.

According to this architecture, the auxiliary engine 5 is not necessarily identical to the main propulsive engines 52a, 52b and, in a general way, its nominal thrust is lower, but not necessarily, than that of said main jet engines, and the installation of a specific auxiliary power generator is avoided.

The result is a less noisy aircraft 1 due to the fact that the total thrust installed for the phases of takeoff is lower than that obtained for a conventional design and due to the fact that the auxiliary jet engine 5 integrated into the fuselage 2 is itself less noisy because of its fitting.

Indeed, on the one hand the lateral air intakes 51a, 51b by their internal geometry authorize an effective acoustic treatment which limits the propagation of the noise emitted forwards by the fan and the arrangement of the jet engine into the fuselage tail cone 22 makes it possible to implement a long nozzle 53 at the rear outlet of the auxiliary jet engine 5, which long nozzle is favorable to a reduction of the noise emitted by the engine jet 54.

The disclosed embodiments makes it possible to produce an aircraft optimized with respect to the propelling assembly including a jet engine integrated in the rear tail of the aircraft running only during flying phases where an additional thrust is necessary.

What is claimed is:

1. An auxiliary propulsive system for an aircraft, integrated within a tail cone of a fuselage, said propulsive system comprising an auxiliary jet engine, having at least one operating mode in which said auxiliary jet engine is a propulsive engine, a carrying structure to which said engine is fixed, a device for supplying external air to said jet engine, wherein:
   the carrying structure comprises beams assembled to the aircraft, overhanging rearward of a rear load carrying frame of the fuselage in a substantially longitudinal direction of the fuselage and comprises one or more rear frames behind the rear load carrying frame, the beams being interdependent of the frames at a periphery of the frames along the tail cone near coverings of the fuselage:
   the auxiliary jet engine is fixed to the carrying structure by at least two lateral beams of said carrying structure, overhanging rearward a most backward frame of the rear frames, at least up to a rear attachment point longitudinal position of the auxiliary jet engine, and lateral to the engine;
   the at least two lateral beams extend forward of the rear load carrying frame into the fuselage structure;
   a space between the rear load carrying frame and the most backward frame being available for supplying external air to the auxiliary jet engine.

2. The propulsive system according to claim 1, wherein each lateral beam of the carrying structure comprises a lower half-beam and a higher half-beam, said lower half-beam and higher half-beam being substantially at a horizontal symmetry plane of the auxiliary jet engine on the rear of the front attachments of the auxiliary jet engine to the lateral beams and being separated ahead from attachments of the auxiliary jet engine to the lateral beams by forming a fork such that the lower half beam and the higher half-beam are fixed at the rear load carrying frame of the fuselage on distant locations.

3. The propulsive system according to claim 2, wherein the carrying structure includes a higher beam substantially in a longitudinal, vertical symmetry plane of fuselage.

4. The propulsive system according to claim 3, wherein the higher beam comprises at least two assembled half-beams and/or the whole or a part of the frames and/or the whole or a part of the half-frames comprise each one at least two assembled elements of close forms.

5. The propulsive system according to claim 3, including engine cowls articulated at the higher beam and opening upward or articulated into front parts of said cowls and opening forward.

6. The propulsive system according to claim 1, wherein the load carrying frame corresponds to a sealed bottom of a pressurized cabin of the fuselage of the aircraft.

7. The propulsive system according to claim 1, wherein the lateral beams are arranged so that a space between the rear load carrying frame and the most backward frame and under said lateral beams is available to allow a crossing structure of a horizontal empennage of the aircraft to cross the tail cone of fuselage under said beams.

8. An aircraft comprising a propulsive system according to claim 1.

* * * * *

UNITED STATES PATENT AND TRADEMARK OFFICE
CERTIFICATE OF CORRECTION

| | | |
|---|---|---|
| PATENT NO. | : 8,220,739 B2 | Page 1 of 1 |
| APPLICATION NO. | : 12/393625 | |
| DATED | : July 17, 2012 | |
| INVENTOR(S) | : Olivier Cazals | |

It is certified that error appears in the above-identified patent and that said Letters Patent is hereby corrected as shown below:

Column 9, line 7, Claim 4, after the word one insert -- of the --, therefor.

Signed and Sealed this
Eleventh Day of September, 2012

David J. Kappos
*Director of the United States Patent and Trademark Office*